United States Patent [19]

Commins

[11] Patent Number: 4,896,985
[45] Date of Patent: Jan. 30, 1990

[54] SNUGGING CONNECTION AND METHOD

[75] Inventor: Alfred D. Commins, Danville, Calif.

[73] Assignee: Simpson Strong-Tie Company, Inc., San Leandro, Calif.

[21] Appl. No.: 345,910

[22] Filed: May 1, 1989

[51] Int. Cl.$^4$ .............................................. B25G 3/00
[52] U.S. Cl. ........................................ 403/11; 52/712; 248/544; 403/232.1; 403/403; 403/405.1
[58] Field of Search ............... 403/403, 402, 232.1, 403/405.1, 400, 394, 11; 411/538; 248/544, 547; 52/712

[56] References Cited

U.S. PATENT DOCUMENTS

| | | | |
|---|---|---|---|
| 3,281,168 | 10/1966 | Dufficy | 403/405.1 X |
| 3,494,645 | 2/1970 | Jureit | 403/405.1 |
| 4,291,996 | 9/1981 | Gilb | 403/232.1 X |
| 4,423,977 | 1/1984 | Gilb | 403/232.1 |
| 4,480,941 | 11/1984 | Gilb et al. | 403/232.1 |
| 4,560,301 | 12/1985 | Gilb | 403/403 X |
| 4,572,695 | 2/1986 | Gilb | 403/232.1 |
| 4,714,372 | 12/1987 | Commins | 403/405.1 X |

Primary Examiner—Randolph A. Reese
Assistant Examiner—Carol I. Bordas
Attorney, Agent, or Firm—James R. Cypher

[57] ABSTRACT

A snugging connection and method for moving a movable structural member into closer contact with a stationary structural member in which a connector for joining the two structural members is formed with a snugging member which is activated by driving a fastener through an elongated opening in the connector; snagging an end of the snugging member; causing the snugging member to pivotally rotate and move the connector in a direction generally in the direction of the longitudinal axis of the elongated opening. The two structural members are thus brought closer to each other and may cause the connector to be in tension.

8 Claims, 5 Drawing Sheets

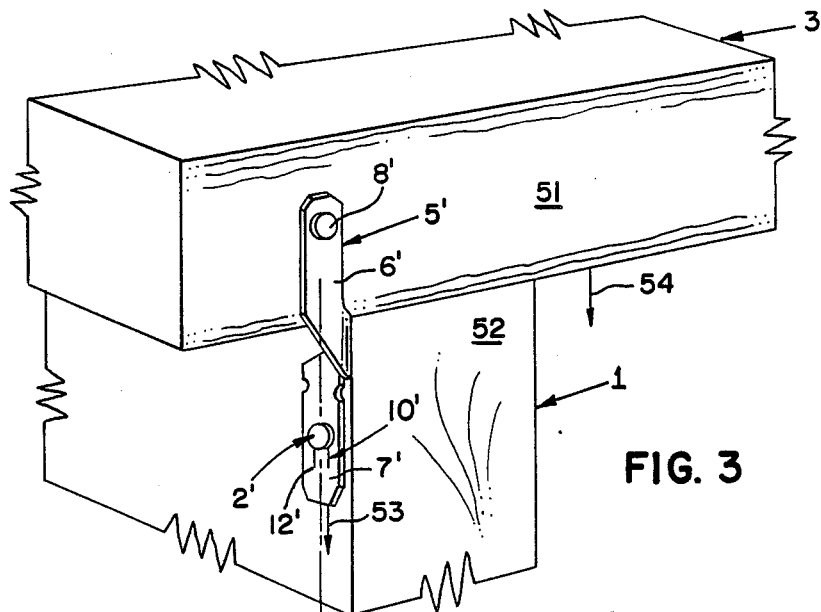
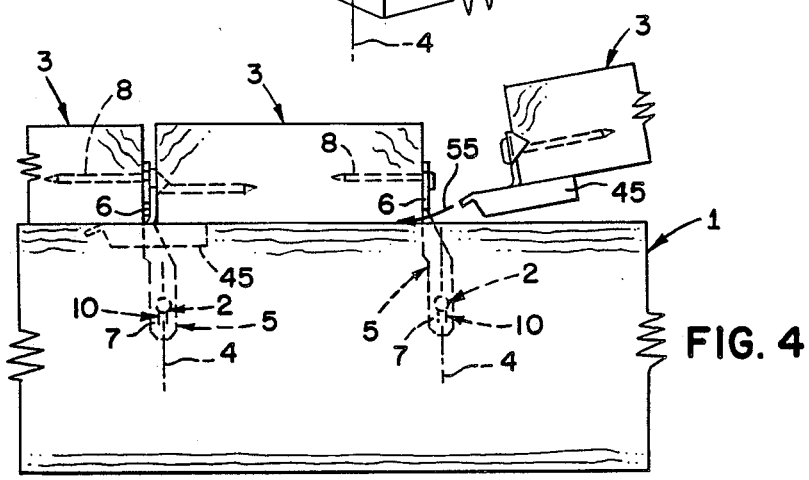
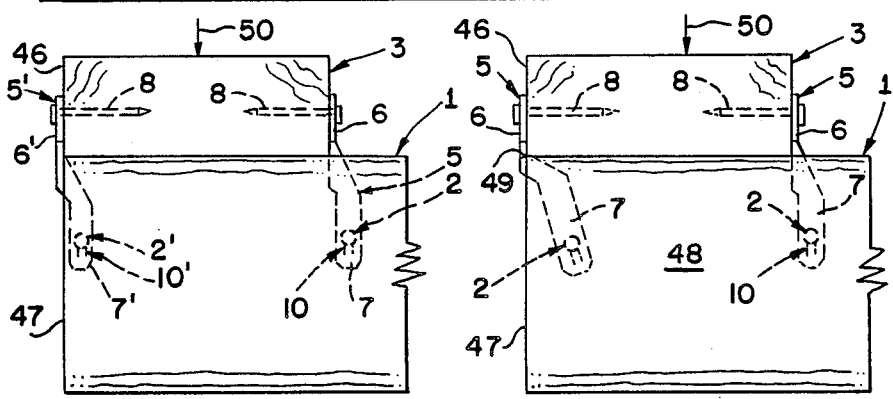

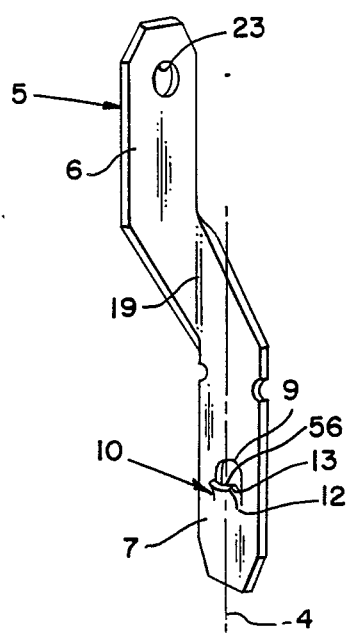
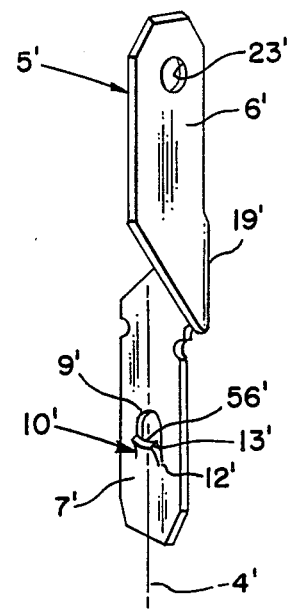
FIG. 7    FIG. 8
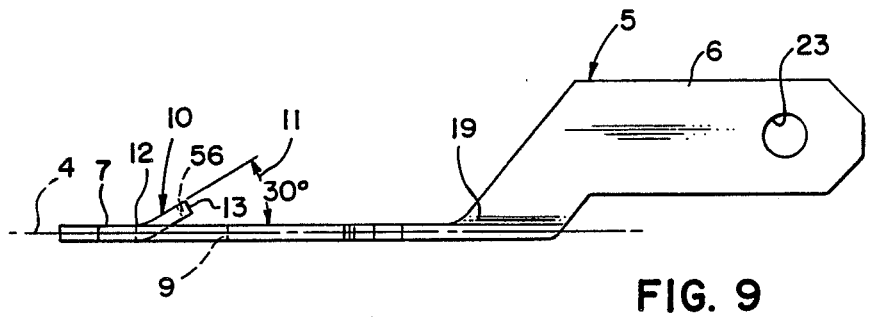
FIG. 9
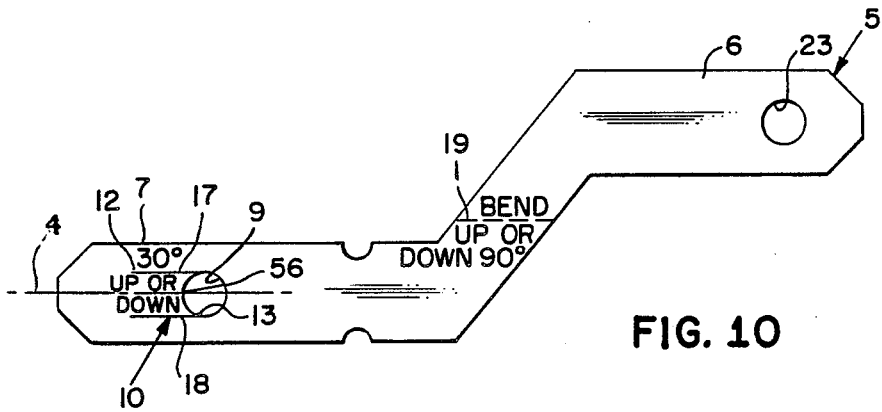
FIG. 10

SNUGGING CONNECTION AND METHOD

BACKGROUND

This invention relates to a device and method for drawing two structural members closer together. Common examples of the use of the device and method are in the construction of patios, decks, and boardwalks. Still other uses are in drawing supported joist members closer to header supporting members, in butt joints and in other joints where it is important to maintain two structural members such as wood members in close tight fitting contact.

Toenailing techniques may be used to draw wood members together, but since such nailing is not at right angles to the load forces, such connections do not remain in tension as the wood shrinks.

Sheet metal connectors which have largely replaced toenailing procedures in commercial construction throughout much of the country have not addressed the problem of placing the connectors and the structural members they connect in tension.

SUMMARY OF THE DISCLOSURE

The device and method of the present invention employs a specially shaped projection adjacent an elongated opening to cause the connector to be placed in tension between structural members. This result is effected by providing either a snubbing tab or by deforming the metal adjacent the elongated opening, and driving a fastener at right angles to the plane of the opening so that the head of the fastener snags the projection and depending whether the nail is given into the movable or fixed structural member either the connector moves or the structure into which the nail is being driven moves.

An object of the present invention is to provide an inexpensive device which is easy to use and can be utilized with most every type of sheet metal connector to cause two structural members to be drawn more closely together.

A further object is to provide a connector and method which may actually cause a sheet metal connector to be placed in tension between two structural members.

A still further object is to provide a connector and method which can hold two structural members in close fitting contact even after the structural members have shrunk due to drying of the wood structural members.

Another object is to provide a connector for holding wood members closely together without toenailing.

DESCRIPTION OF THE DRAWINGS

FIG. 3 is a perspective view of the device of the present invention embodied in a modified form of the connector illustrated in FIG. 2.

FIG. 4 is a side elevation view of the device of the present invention embodied in the connector illustrated in FIG. 1. The connector is illustrated in conjunction with another connector in constructing a wood deck.

FIG. 5 is a side elevation view of the device of the present invention embodied in the connectors illustrated in FIG. 2 and FIG. 3.

FIG. 6 is a side elevation view of the device of the present invention embodied in connectors illustrated in FIG. 5 with one of the connectors bent in the field to adapt to special connections.

FIG. 7 is an enlarged perspective view of the connector illustrated in FIG. 2.

FIG. 8 is an enlarged perspective view of the connector illustrated in FIG. 3.

FIG. 9 is an enlarged side view of the connector illustrated in FIG. 7.

FIG. 10 is a plan view of the connector shown in FIG. 9 in blank form prior to bending.

DESCRIPTION OF THE PREFERRED EMBODIMENTS

Figure 12:
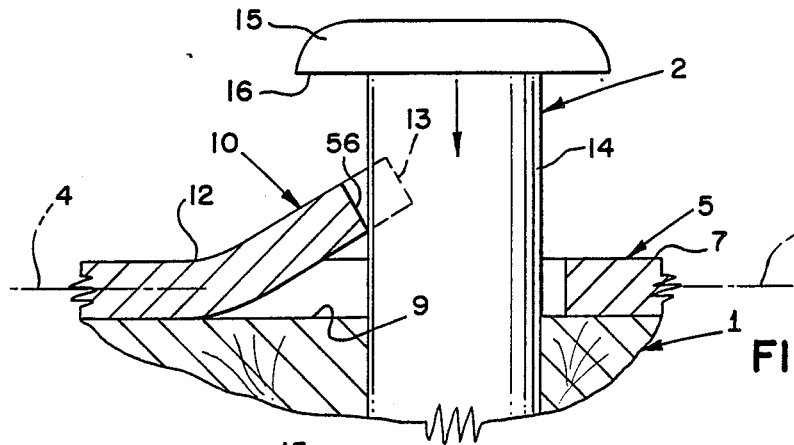
FIG. 12 is a cross sectional view taken along line 12—12 of FIG. 11. A portion of a fixed structural member and head end of a nail fastener are shown to illustrate the operation of the device of the present invention.
Figure 14:
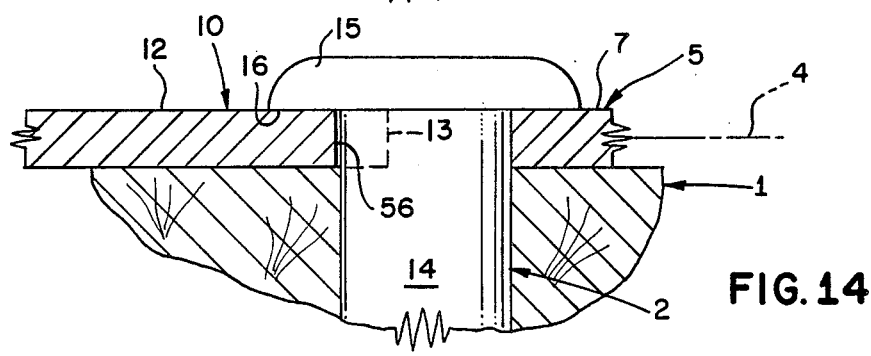
FIG. 14 is a cross sectional view like that of FIG. 13 with the fastener nail fully embedded into the fixed structural member to illustrate the operation of the device of the present invention.

The snugging connection of the present invention consists briefly of a stationary structural member 1 selected for receiving a fastener 2 therein for holding the fastener 2 in resistance to withdrawal and shear forces; a movable structural member 3 positioned adjacent to the stationary structural member 1 and movable with respect to the stationary structural member; a generally rigid connector 5 dimensioned for joining the stationary structural member 1 and the movable structural member 3 and having a connected end 6 and a snugging end 7; connection means such as a nail 8, screw, clamp or other attaching device affixing the connected end 6 of the generally rigid connector 5 to the movable structural member 3; an elongated opening 9 formed in the snugging end 7 of the generally rigid connector 5 elongated along the longitudinal axis 4; snugging means 10 formed in the snugging end 7 of the generally rigid connector 5 adjacent the elongated opening 9 projecting at a selected angular position at an angle 11 (see FIG. 8) to the longitudinal axis 4 from a proximal pivotal end 12 to a distal end 13, with the snugging means 10 rotatable about the proximal pivotal end 12 from the first selected angular position as illustrated in FIG. 12 to a second position illustrated in FIG. 14 generally parallel to the longitudinal axis 4; and a fastener 2 having a shank 14 and a head 15 attached thereto with the head 15 having a shoulder 16 projecting at a generally right angle thereto with the shank diameter 14 being selected for receipt within the elongated opening 9 and the shoulder 16 dimensioned for snagging and rotating the distal end 13 of the snugging means 10 to the second position as illustrated in FIG. 14 for moving the movable structural member 3 relative to the stationary structural member 1 in the general direction of the longitudinal axis 4 as the fastener 2 is driven into the stationary structural member 1.

Figure 11:
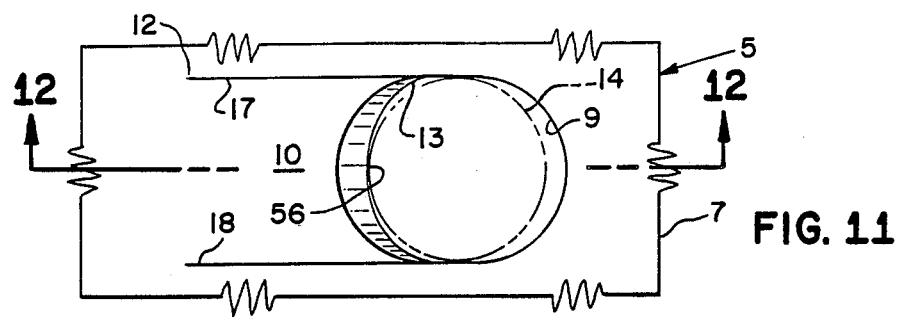
FIG. 11 is an enlarged portion of the connector illustrated in FIG. 2 taken generally along curved line 11—11 of FIG. 2.
Figure 13:
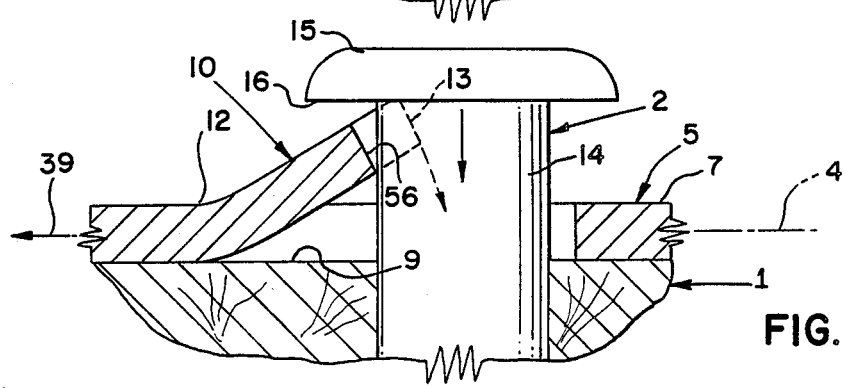
FIG. 13 is a cross sectional view like that of FIG. 12 with the nail further advanced into the fixed structural member.

Snugging means 10 may be constructed by deforming the metal adjacent to elongated opening 9 so that there is a projection much like the projection 10 illustrated in FIGS. 12 and 13. The less expensive and preferred way of making the snugging means 1, however, is to form a snugging tab member which is also indicated by the number 10 and is formed from the snugging end 7 by cutting two slits 17 and 18 (see FIGS. 10 and 11) which intersect the elongated opening 9 as shown in FIG. 11. Snugging tab 10 is bent upwardly at an initial angle of about 30° as illustrated in FIG. 9.

Figure 1:
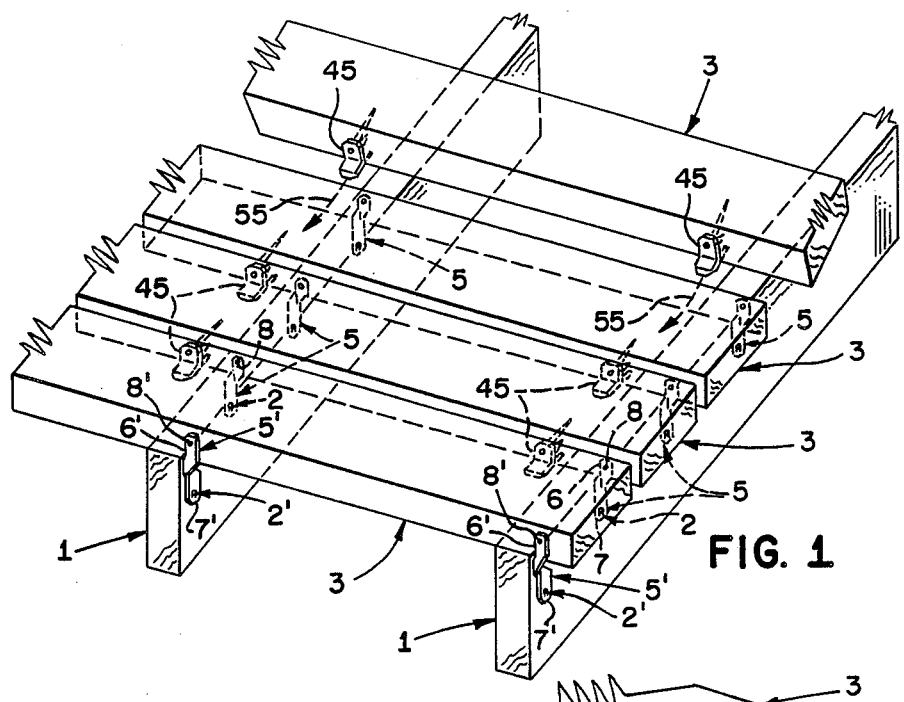
FIG. 1 is a perspective view of one example of the use of the device of the present invention embodied in one example of a connector used in a connection and method of the present invention.
Figure 2:
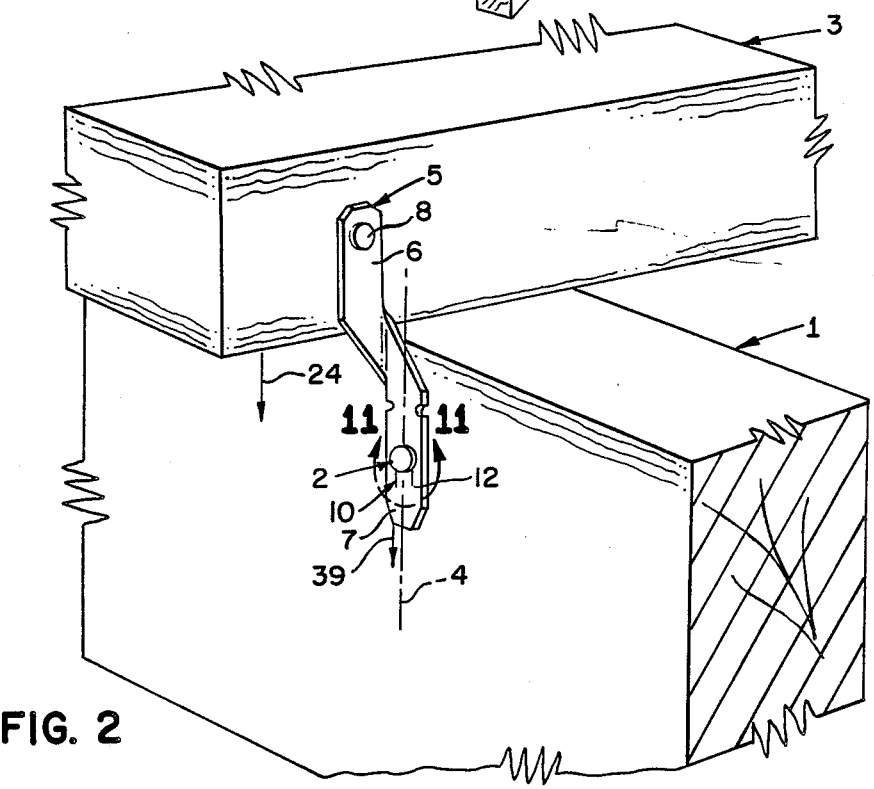
FIG. 2 is an enlarged perspective drawing of the device of the present invention embodied in a connector illustrated in FIG. 1.

The stationary structural member may be a supported member, but most often it is the supporting member 1 as illustrated in FIGS. 1 and 2 and the movable structural member is a supported member as indicated by the number 3. An example of a rigid connector is the deck board tie illustrated in FIGS. 1 and 2 in which the connected end 6 is rotatably twisted or bent along a bend line 19 (see FIG. 10) at a generally 90 degree angle to the snugging end 7. When bent in one direction along line 19, the deck board tie 5 illustrated in FIGS. 1, 2 and 7 is formed. When bent along line 19 in the opposite direction, the reverse deck board tie 5' illustrated in FIGS. 3 and 8 is formed. Note that snugging means 10' of FIG. 8 is bent in the opposite direction as snugging means 10 in FIG. 7.

The method of snugging two structural members may be illustrated by referring to FIGS. 1, 2, 11, 12, 13, and 14 of the drawings. A stationary structural member 1 capable of receiving a fastener 2 therein for holding the fastener in resistance to withdrawal and shear forces is selected. A movable structural member 3 such as a deck board is placed on top of the stationary structural member such as a joist member 1. The connected end 6 is then affixed to the deck board 3 by driving a fastener such as a screw or nail 8 into the deck board 3 through opening 23. Fastener 2 is then placed against distal end 13 of the snugging means 10 in elongated opening 9. Fastener 2 is then driven through the elongated opening 9 into the stationary structural member 1 as shown in FIG. 12 so that the shoulder 16 snags and rotates the distal end 13 of the snugging means 10 as shown in FIG. 13 to the second position as illustrated in FIG. 14 thus moving the movable structural member 3 relative to the stationary structural member 1 in the general direction of the longitudinal axis 4 as indicated by arrow 24. Connector 5 also moves in the direction shown by arrow 39 in FIGS. 2 and 13.

Figures 16, 17:
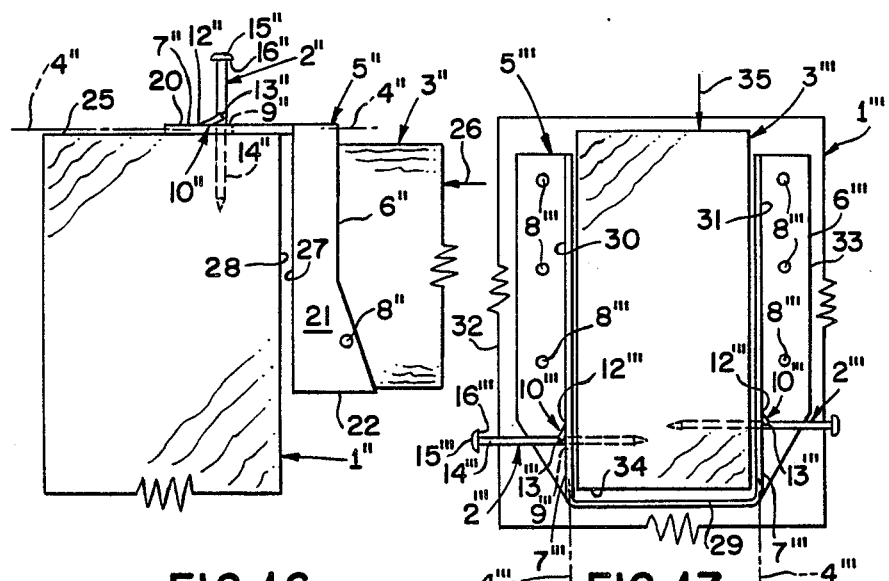
FIG. 16 is a side elevation view of the device of the present invention shown in another type of connector; viz., a top flange hanger.
FIG. 17 is an end view of the device of the present invention shown in still another type of connector; viz., standard side mounted connector

FIG. 16 illustrates another type of connector 5" in which the device of the present invention may be employed. The snugging means 10 is constructed just as it is in FIGS. 11-14 and is not repeated. Like members are identified by like numbers except with the addition of the double prime mark ("). Connector 5" is a standard sheet metal joist connector with a top flange 20, stirrups 21 and seat 22. The stationary structural member is a supporting member 1" which in the illustration is a wood header beam. The movable structural member is a supported member 3" which may be a joist member supported by seat 22. The snugging means 10" is formed in the top flange 20.

Operation of the snugging means in FIG. 16 is as follows. Top flange 20 is placed on top face 25 of header beam 1". The supported joist member 3" preferably is placed upon seat 22, but need not be. Preferably nails 8" attach joist member 3" to the stirrup 21 of the hanger 5". Fastener 2" such as a nail is placed against the distal end 13" of the snugging tab 10" and inserted through elongated opening 9". The nail 2" is then driven into stationary structural member 1" until shoulder 16" of the nail head 15" snags the distal end 13" of the snugging tab 10". As the nail is driven into the wood, the snugging tab 10" is bent toward the plane of the flange 20 which causes the entire hanger 5" to move in the direction of arrow 26. Thus the back edge 27 of stirrup 21 is drawn in close proximity or against edge 28 of stationary structural member 1".

Referring to FIG. 17, still another form of the invention is illustrated in which the generally rigid connector 5''' is a hanger having a seat member 29, stirrup members 30 and 31 and side flange members 32 and 33. This form of the invention differs from all of the previously described forms of the invention in that fastener 2''' is driven into the movable structural member 3''' instead of into the stationary structural member as heretofore described. Still referring to FIG. 17, the stationary structural member is header member 1''' and is a supporting member. The movable structural member 3''' is a supported member such as a wood joist. The snugging means 10''' is formed in the stirrup members 30 and 31. The snugging means 10''' is formed exactly like the snugging means previously described in FIGS. 1 and 2, and operates exactly as described and illustrated in FIGS. 11-14. Like parts have been given like numbers with the additional triple prime designation ('''). Since the construction is obvious, it will not be repeated.

Since the movement of the form of invention illustrated in FIG. 17 is different, it is described as follows: First, hanger connector 5''' is attached to stationary supporting member 1''' by means of fasteners such as nails 8'''. Next, supported movable member 3''' is installed on seat 29. Where the bottom edge 34 of the supported movable member 3''' does not seat in close fitting relation to the seat as illustrated in FIG. 17, the device of the present invention will be of assistance. The shank 14''' is placed in registration with the distal end 13''' of the snugging means 10''' and inserted through elongated opening 9'''. The fastener 2''' is driven into movable supported member 3''' and as shoulder 16''' snags the distal end 13''' of the snugging means 10''', the snugging means 10''' rotates about proximal pivotal end 12''' forcing fastener 2''' and movable supported member 3''' in the direction of arrow 35 against seat member 29. Upon completion, hanger 3''' will be in compression with respect to the supporting structural member 1''' and the supported structural member 3'''. As the wood structural members shrink in size due to loss of moisture, bottom edge 34 of supported structural member 3''' will more likely remain in contact with the hanger seat 29.

Figure 18:
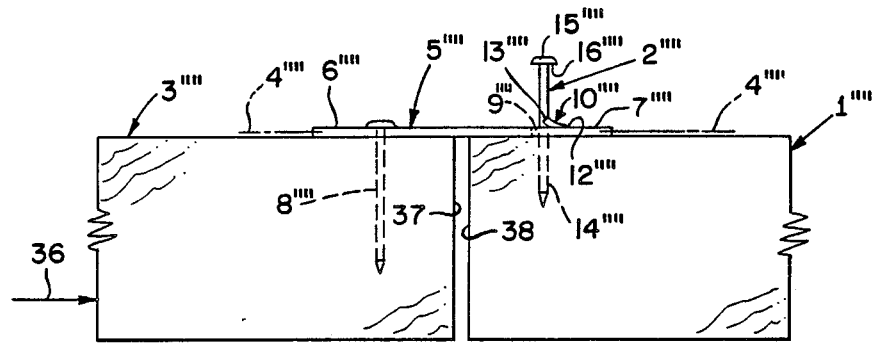
FIG. 18 is a side elevation view of the device of the present invention shown in a still further connector; viz., a sheet metal strap.

Still another form of the invention is illustrated in FIG. 18 where the generally rigid connector 5'''' is a strap member and the stationary structural member 1'''' and the movable structural member 3'''' are positioned in end to end abutting relationship. Like elements have been given identical numbers with the addition of four prime marks ('''') and the construction of the invention is not repeated for purposes of brevity.

Operation of the invention as illustrated in FIG. 18 is as follows. Fastener 8'''' is driven through an opening in connected end 6'''' into movable structural member 3''''. Stationary structural member 1'''' is then placed adjacent to movable structural member 3'''' in a butt relationship. Fastener 2'''' is then placed in registration with distal end 13'''' of snugging means 10'''' and driven through elongated opening 9'''' into stationary structural member 1''''. As shoulder 16'''' snags distal end 13'''' and rotatably bends snugging means 10'''' about proximal pivotal end 12'''', strap 5'''' as well as movable structural member 3'''' move in the direction of arrow 36 until structural member end 37 is butted against structural member end 38.

Referring to FIGS. 7 and 10–14, an important feature of the invention is illustrated which is adaptable to all forms of the invention. Specifically, distal end 13 of snugging means 10 is preferably formed in a semicircular shape 56 which has generally the same radius as the shank 14 of fastener 2. The semicircular shape 56 helps to hold the shank 14 of fastener 2 against the distal end 13 of the snugging means 10 while fastener 2 is being driven into the structural member. Further, once the nail is driven, the shank 14 of the fastener is closely held by the walls of the elongated opening and the semicircular shape 56 of the snugging means 10 thus prevents relative movement between the fastener and the connector 5.

Figure 15:
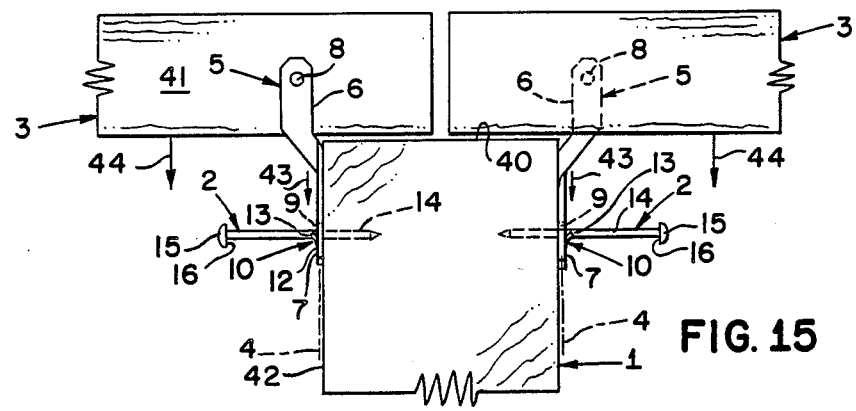
FIG. 15 is a side elevation view of the connector shown in FIG. 7 illustrated in a butt connection.

Referring to FIG. 15, a common use of the connector 5 illustrated in FIG. 7 is shown. Stationary structural member 1 may be a joist member in a deck as shown in FIG. 1. In the illustration, the movable structural members 3 are two deck boards which must be butted at the top edge 40 of the joist member 1. The connectors 5 are installed by first placing the connected end 6 against the side edge 41 of member 3 and the snugging end against the side edge 42 of member 1. Nail 8 is then driven through an opening 23 in connected end 6 into movable structural member 3. Next, weight is placed on board 3 so that it is pressed against top edge 40 of member 1. Fastener 2 is then placed against distal end 13 of snugging means 10 and driven into structural member 1 until shoulder 16 snags distal end 13 of the snugging means 10 and rotates it until it is planar with snugging end 7. The rotation of snugging means 10 causes connector 5 to move in the general direction of longitudinal axis 4 in the direction of arrow 43 and movable structural member 3 to move in the same direction as indicated by arrow 44.

Referring to FIG. 1, the device of the present invention is used in constructing a deck. The connectors 45 illustrated are fully described in copending U.S. patent application filed the same day as the present application and entitled DECK CLIP SYSTEM, METHOD AND CONNECTOR CONNECTION. Connector 45 is illustrated in this application since it is an example of another connector which works very effectively with the connector 5 of the present invention. As shown in FIGS. 1 and 4, a portion of connector 45 is rotated under a deck board 3 as shown by arrow 55. Connectors 5, when used in a deck system as shown in FIG. 1' should be placed on opposite edges of the deck boards and at every intersection of a deck board and a supporting joist member as shown.

The device of the present invention may be used in connections where it is necessary to field bend the connector. As an example, FIG. 6 shows a movable structural member 3 in which edge 46 is flush with end 47 of joist member 1. After connected end 6 is attached to board 3 by nail 8, in order to bring snugging end 7 in face to face relation with face 48 of joist member 1, connector 5 is bent along bend line 49 until it in the position generally shown in FIG. 6. Field bending may be done with a hammer or other implement.

Another way of making the connection shown in FIG. 6 is illustrated in FIG. 5. In this case, connector 2' illustrated in FIG. 8 is used. All procedures of attachment are the same except that no field bending is required. In both examples, use of the snugging method results in moving movable structural member 3 in the direction of arrow 50.

FIG. 3 illustrates another connection in which the reverse bend connector 5' may be used. In this case edge face 51 of movable structural member 3 is placed flush with end face 52 of stationary structural member 1. Hammering fastener 2' into structural member 1 bends snugging means 10' causing connector 5' to move in the general direction of longitudinal axis 4 as shown by arrow 53 and movable structural member 3 moves in the direction shown by arrow 54.

I claim:
1. A snugging connection comprising:
   a. a stationary structural member;
   b. a movable structural member positioned adjacent to said stationary structural member and movable with respect to said stationary structural member;
   c. generally rigid connector dimensioned for joining said stationary structural member and said movable structural member and having a connected end and a snugging end;
   d. connection means affixing said connected end of said generally rigid connector to said movable structural member;
   e. an elongated opening formed in said snugging end of said generally rigid connector elongated along a longitudinal axis;
   f. snugging means formed in said snugging end of said generally rigid connector adjacent said elongated opening projecting at a selected angular position at an angle to said longitudinal axis from a proximal pivotal end to a distal end, with said snugging means rotatable about said proximal pivotal end from said first selected angular position to a second position generally parallel to said longitudinal axis; and
   g. a fastener having a shank and a head attached thereto with said head having a shoulder projecting at a generally right angle thereto with said shank diameter being selected for receipt within said elongated opening and said shoulder dimensioned for snagging and rotating said distal end of said snugging means to said second position for moving said movable structural member relative to said stationary structural member in the general direction of said longitudinal axis as said fastener is driven into said stationary structural member.

2. A snugging connection as described in claim 1 wherein:
   a. said snugging means is a snugging tab member formed from said snugging end.

3. A snugging connection as described in claim 1 wherein:

a. said stationary structural member is a supporting member;
b. said movable structural member is a supported member; and
c. said generally rigid connector is formed with said connected end rotatably twisted at a generally 90 degree angle to said snugging end.

4. A snugging connection as described in claim 1 wherein:
a. said stationary structural member is a supporting member;
b. said movable structural member is a supported member;
c. said generally rigid connector is a hanger having a top flange and a seat for carrying said supported member, and said snugging means is formed in said top flange.

5. A snugging connection as described in claim 1 wherein:
a. said generally rigid connector is a hanger having a seat member, stirrup members and side flange members;
b. said stationary structural member is a supporting member;
c. said movable structural member is a supported member; and
d. said snugging means is formed in said stirrup members.

6. A snugging connection as described in claim 1 wherein:
a. said generally rigid connector is a strap member; and
b. said stationary structural member and said movable structural member are positioned in end to end abutting relationship.

7. A snugging connection as described in claim 2 wherein:
a. said distal end of said snugging tab member is formed in a generally semicircular shape have a radius dimensioned to register with said shank of said fastener.

8. A method of snugging two structural members comprising:
a. selecting a stationary structural member capable of receiving a fastener therein for holding said fastener in resistance to withdrawal and shear forces;
b. selecting a movable structural member
c. positioning said movable structural member adjacent to said stationary structural member so as to be movable in the general direction of a selected longitudinal axis;
d. selecting a generally rigid connector dimensioned for joining said stationary structural member and said movable structural member and having a connected end and a snugging end and having an elongated opening formed in said snugging end which is elongated along said selected longitudinal axis and having a snugging means formed in said snugging end of said generally rigid connector adjacent said elongated opening projecting at a first selected angular position at an angle to said selected longitudinal axis and having a proximal pivotal end and a distal end, with said snugging means rotatable about said proximal pivotal end from said first selected angular position to a second position generally parallel to said selected longitudinal axis;
e. affixing said connected end of said generally rigid connector to said movable structural member;
f. selecting a fastener having a shank and a head attached thereto with said head having a shoulder projecting at a generally right angle thereto with said shank diameter being selected for receipt within said elongated opening;
g. placing said fastener in said elongated opening in registration with distal end of said snugging means;
h. driving said fastener through said elongated opening into said stationary structural member so that said shoulder snags and rotates said distal end of said snugging means to said second position thus moving said movable structural member relative to said stationary structural member in the general direction of said selected longitudinal axis.

* * * * *